United States Patent
Rose

(10) Patent No.: US 8,982,366 B2
(45) Date of Patent: Mar. 17, 2015

(54) AUTOMATED VARIABLE INFORMATION REGRESSION TESTING

(75) Inventor: Philip C. Rose, Sodus, NY (US)

(73) Assignee: Xerox Corporation, Norwalk, CT (US)

( * ) Notice: Subject to any disclaimer, the term of this patent is extended or adjusted under 35 U.S.C. 154(b) by 1583 days.

(21) Appl. No.: 11/567,241

(22) Filed: Dec. 6, 2006

(65) Prior Publication Data

US 2008/0137120 A1    Jun. 12, 2008

(51) Int. Cl.
*G06K 1/00*    (2006.01)
*G06F 3/12*    (2006.01)

(52) U.S. Cl.
CPC ............ *G06F 3/1204* (2013.01); *G06F 3/1208* (2013.01); *G06F 3/1256* (2013.01); *G06F 3/1284* (2013.01)
USPC ........... 358/1.13; 714/722; 714/800; 714/819

(58) Field of Classification Search
USPC ........................ 358/1.13; 714/722, 800, 819
See application file for complete search history.

(56) References Cited

U.S. PATENT DOCUMENTS

| | | | |
|---|---|---|---|
| 6,032,004 A | 2/2000 | Mirabella, Jr. et al. | |
| 6,205,452 B1 | 3/2001 | Warmus et al. | |
| 6,952,275 B2 | 10/2005 | Ramot et al. | |
| 2002/0075505 A1* | 6/2002 | Murray | 358/1.15 |

* cited by examiner

*Primary Examiner* — Peter K Huntsinger
(74) *Attorney, Agent, or Firm* — Gibb & Riley, LLC

(57) ABSTRACT

A method automatically performs regression testing of output of an altered variable information print job (program). In one embodiment, the method begins by supplying test data to a variable information (VI) print job to produce first sample data. Next, the method applies a numeric generation application to the sample data to produce numerical representations. Then, the VI print job is altered and the same test data is supplied to the altered VI print job to produce second sample data. Again, the numeric generation application is applied to the second sample data to produce more of the numerical representations. The numerical representations are then compared to identify altered data records caused by the altering of the VI print job.

16 Claims, 2 Drawing Sheets

AUTOMATED VARIABLE INFORMATION REGRESSION TESTING

BACKGROUND

Embodiments herein generally relate to variable information print programs, and more particularly, concern an automated variable information regression testing method, system, and computer program product.

A single variable information job, such as utilized in transactional and personalized marketing printing environments, is akin to a computer program, in that it contains commands to combine one or more input file specifications with one or more design specifications to produce the final output. Over the course of time, requests to edit this job, or program, become necessary in order to handle changes—input file specifications, design element changes, and so forth. A common method of regression testing such changes—insuring that such changes do not affect areas of the program that should remain the same—is to create a series of outputs from a sample set of data both before and after the edits, and manually or automatically visually compare these two sets of output for any visual differences. As the number of samples, the number of design specifications, or the number of sample data instances (or any combination thereof) increases, the number of visual comparisons necessary also increases, and the size and complexity of the task can grow to such unmanageable proportions that change requests may linger unfulfilled because the cost to perform the testing exceeds the cost saved by the change.

Variable information (VI) sites can have hundreds of active VI programs (jobs) in place. Many of these programs utilize multiple input formats. For example, it would not be uncommon to discover that a simple monthly billing program receives input data from 5 or more data formats in a single run—commercial accounts, personal accounts, special treatment accounts, subsidiary company accounts, and so on. When a change is necessary, perhaps one of the many input formats requires an additional field in order to accommodate a new item on the output page—there is a requirement that nothing else in the job be affected by this change.

Variable information printing, and transactional printing in particular, is a field where the only acceptable level of defects is zero. Even one defect in a financial transaction can result in significant penalties. As such, significant efforts are required to insure that any changes to an existing process are fully tested, and no change occurs outside of the intended area.

SUMMARY

Embodiments herein include a method that automatically performs regression testing of output of an altered variable information print job (program). In one embodiment, the method begins by supplying test data to a variable information (VI) print job to produce sample data. Next, the method applies a numeric generation application to the sample data to produce numerical representations. Then, the VI print job is altered and the same test data is supplied to the altered VI print job to produce second sample data. Again, the numeric generation application is applied to the second sample data to produce more of the numerical representations. The numerical representations are then compared to identify altered data records caused by the altering of the VI print job.

In a more specific embodiment, the method supplies test data to the first variable information (VI) print job to produce first sample data. The first sample data comprises a plurality of first data records. Then, the numeric generation application is applied to the first sample data to produce first numerical representations for each first data record within the first sample data. Again, the first VI print job is altered to create the altered VI print job and the same test data is supplied to the altered VI print job to produce second sample data. Similarly, the second sample data comprises a plurality of second data records. The numeric generation application is applied to the second sample data to produce second numerical representations for each second data record within the second sample data. Then, the method compares the first numerical representations with corresponding ones of the second numerical representations to identify altered data records within the second data records caused by the altering of the first VI print job.

The method can determine which data records were intended to be changed as a result of the altering of the first VI print job and remove the data records that were intended to be changed from the altered data records. Then, the user can manually or automatically compare the first data records with corresponding ones of the altered data records (that should not have changed).

The process of comparing the first and second numerical representations identifies the altered records as ones of the second data records that correspond to the second numerical representations that are different than corresponding ones of the first numerical representations. In other words, if the numerical representations of corresponding first and second data records match, they are considered to be the same and are not identified as altered records. To the contrary, if the numerical representations of corresponding first and second data records do not match, they are considered to be altered records. If such records were not intended to be changed by the altering of the VI print job, they are maintained as being identified as altered records so that they can be later evaluated by the user.

The VI print job generally comprises a plurality of VI print programs. Therefore, the process of altering the VI print job can actually comprise only a single alteration of just one of the VI print programs or can comprise multiple alterations of one or more VI print programs.

The embodiments herein also include a system for automatically performing regression testing of output of an altered variable information print job (program). In one example, the system includes a processor, a numeric generation application, an editor, and a comparator all connected together (physically or operatively).

The processor is adapted to perform many functions, one of which includes processing the variable information (VI) print job. As described above, the VI print job produces first sample data from test data when processed by the processor. The numeric generation application is adapted to produce the numerical representations from the first sample data.

The editor is adapted to receive input from users and other sources to alter the VI print job so as to create the altered VI print job. Again, the altered VI print job is adapted to produce the second sample data from the test data, when processed by the processor. Further, the numeric generation application is adapted to produce the numerical representations from the second sample data.

The comparator is adapted to compare the numerical representations to identify altered data records caused by the altering of the first VI print job. The comparator is further adapted to identify the altered records as ones that correspond to numerical representations that are different after the altering of the VI print job.

The editor is further adapted to receive input regarding which data records within the second data were intended to be changed as a result of the altering of the VI print job. The processor is further adapted to remove the data records that were intended to be changed from the altered data records. Also, the editor is further adapted to alter a characteristic of at least one of the VI print programs. The editor can comprise a user interface, etc.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

When regression testing VI programming and/or process changes, a sample data set is created with the existing data. That data is then pushed through the existing program (job), and the resultant output is saved as a reference. After the edits to the VI program are completed, the same sample data set is pushed through the new program (job), and the resultant output is manually or automatically visually compared to the reference output.

It is possible, and fairly frequent, that the reference output can entail hundreds, or even thousands, of pages. Financial and insurance companies, for example, frequently generate documents hundreds of pages in length for each customer. The amount of manual labor in such instances forces companies to hold off on any minor changes, primarily because the cost to validate, or regression test, exceeds any savings (or cost avoidance) incurred by making the change. Manual visual inspection of each and every page pair (old to new) is both error-prone and expensive.

One method of regression testing a variable information print program (to insure that changes do not affect areas of the program that should remain the same) is to create a series of outputs from a sample set of data both before and after the edits, and manually or automatically compare these two sets of output for any visual differences. However, as the number of samples, the number of design specifications, or the number of sample data instances (or any combination thereof) increases, the number of visual comparisons necessary also increases. Thus, the size and complexity of the task can grow to such unmanageable proportions that change requests may linger unfulfilled because the cost to perform the testing exceeds the cost saved by the change.

Figure 1:
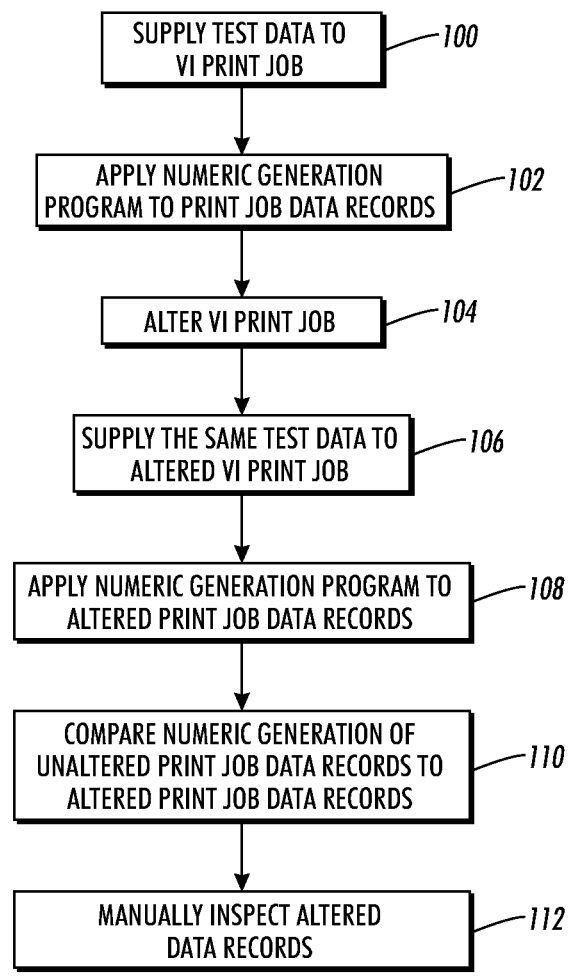
FIG. 1 is a flow diagram illustrating a method embodiment herein.
Figure 2:
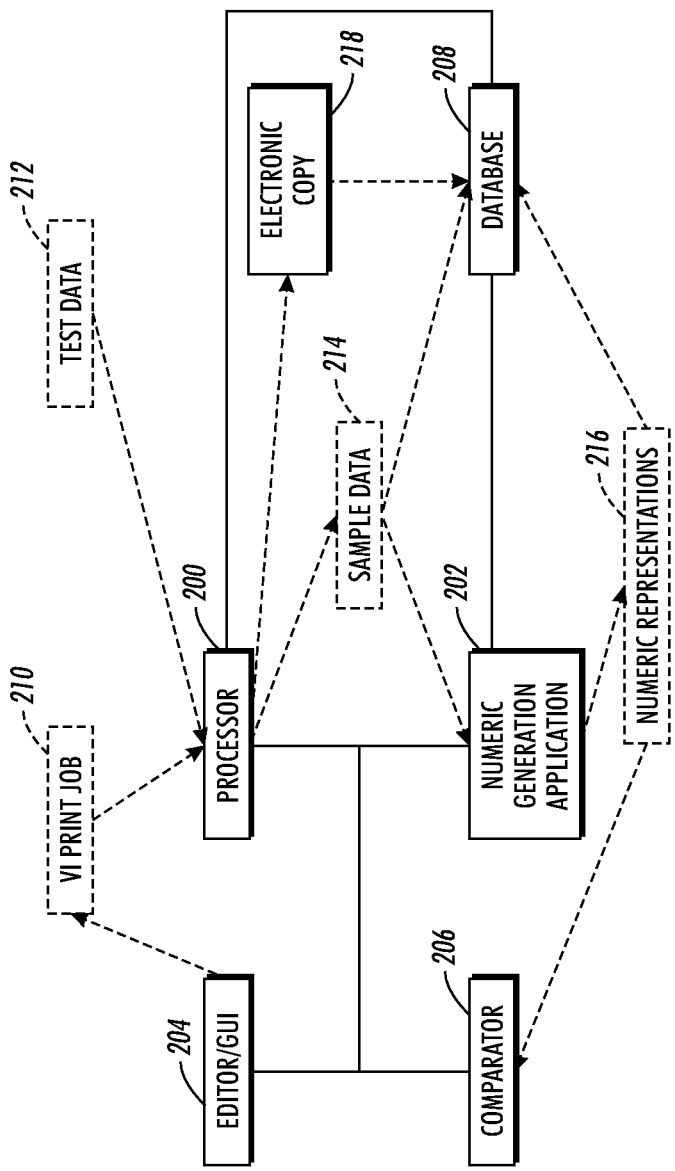
FIG. 2 is a schematic diagram of a system according to embodiments herein.

In view of the foregoing, as shown in FIGS. 1 and 2, embodiments herein include a method that converts the visual data to numeric data and compares such numeric data before and after the VI print program to validate that the revised VI print program does not make unexpected and/or unwanted changes to the visual data. A typical variable information printing system is shown in U.S. Pat. Nos. 6,205,452, and 6,952,275 the complete disclosures of which are incorporated herein by reference.

In one embodiment, the present method begins in item 100 by supplying test data 212 to a variable information (VI) print job 210 to produce first sample data 214. Next, in item 102, the method applies a numeric generation application 202 to the sample data 214 to produce numerical representations 216.

Changing data into numerical representations can be accomplished using numeric generation applications (such as item 202, discussed below) that include parity programs, checksum programs, hashing programs, etc. Checksum applications are currently used in error detecting and correcting. Checksums are stored or transmitted with data and are intended to detect data integrity problems. A checksum is the sum of a group of data items and is used for checking purposes. The checksum is calculated by treating the data items as numeric values. Similarly, a hash table is a dictionary in which keys are mapped to array positions by hash functions. A hash function is a function that maps keys to integers, usually to get an even distribution on a smaller set of values. A key is the part of a group of data by which it is sorted, indexed, cross referenced, etc. Similarly, in binary-coded data, parity is a condition that is maintained such that, in any permissible coded expression, the total number of 1s, or 0s, is always odd or always even. Parity can also be used in error-detecting and error-correcting codes.

Once the sample data is converted into numeric expressions in item 102, the VI print job 210 can be altered (in item 104) and the same test data 212 is supplied to the altered VI print job 210 to produce second sample data 214 (in item 106). In a similar manner to item 102, in item 108 the numeric generation application 202 is applied to the second sample data 214 to produce more of the numerical representations 216. Note that, in FIG. 2, the first and second sample data are both represented by item 214 and the first and second numerical representations are both represented by item 216.

The numerical representations 216 are then compared to identify altered data records caused by the altering of the VI print job 210 in item 110. Then, in item 112, the user can manually or automatically compare the original data records with corresponding ones of the altered data records (that should not have changed) to complete the regression testing without having to visually examine all data records.

The embodiments herein can provide a stored database 208, combining sample data 214 files for any specific instance of a variable information job 210, with resultant hash function values based on the output of each transaction within the sample data file 214, to automatically compare changes to the variable print job 210, significantly reducing the time spent with comparison operations that visually examine most or all pages. Optionally saved image data within the database 208 could be used after this initial comparison to determine programmatically (automatically) the exact position within each document where change(s) occurred.

Thus, the embodiments herein provide an automated process by combining the set of test data 212, which when run through the variable print process 210, produces enough samples 214 to insure the user that the existing or altered variable print process 210 works properly.

The numeric representation 216, which can be generated using a hash or checksum algorithm for example, is created from each sample, and is stored along with the sample data 214. One concept disclosed herein is to store one representation (e.g., a single number, or a series of number/page pairs) for each record within the sample data 214. This hash algorithm is applied against the electronic output from the VI job 210 in such as manner as to be repeatable over time. For example, the methodology can ignore any time/date stamping within the output file, as this type of output will change from run to run. The embodiments herein are not limited to any specific method of creating the numeric representations 216, as a variety of hash code methodologies already exist. The hash code algorithm that is chosen should be capable of being run against a number of file formats.

In some embodiments herein, an electronic copy 218 of the output from each record in the test data 212 can be created. Such a file could be stored in a variety of methods: a Printer Description Language (such as PostScript, PDF, etc.), an image format (such as TIFF, JPEG, etc.), and so on in the database 208, for example.

With embodiments herein, the test data 212, paired with accompanying numeric codes 216, and optional electronic output 218, are stored in electronic form in, for example, the database 208. When regression testing is required, the same test data 212 is run through the altered version of the program 210, the same numeric generation application 202 is run against the output 214, and the resulting data 216 is compared programmatically to the stored data 208. Any differentiation in the hash data for an individual record indicates a change to that record, which can then be automatically or manually compared with the original. Therefore, with embodiments herein the number of visual comparisons that are made is limited to only those data records 214 that experienced a change in numeric representations 216 after the VI print program 210 was altered. Because the numeric representations 216 of all other data records 214 did not change, the time and resource intensive manual or automatic visual comparison of such unchanged data records is not necessary and can be omitted. By limiting visual comparisons to only those data records 214 that produce a change in numeric representation 216 with the revised VI print program 210, the embodiments herein substantially reduce the number of data records 214 that need to be visually compared.

One outcome of comparing the numeric values over image data is an increase in speed, because simple numeric comparisons are faster than image comparisons, particularly when a single test sample might produce a document hundreds of pages in length. Further, if the electronic output 218 for each sample is also stored, then a comparison of the original to new output could be performed to pinpoint exactly where in the output the change occurred.

Although useful as a stand-alone application, embodiments herein can be used within a digital printing system or outsourced service. With such embodiments, a customer sends a series of transactional documents to the digital printing system, which stores, in a database, the output files and resultant hash algorithms for each page. At a later date the customer could send another series of transactional documents to the digital printing system, which could process the new file and compare to the original (reference) set.

In a more specific embodiment, the method supplies test data 212 to the first variable information (VI) print job 210 to produce first sample data 214. The first sample data 214 comprises a plurality of first data records. Then, the numeric generation application 202 is applied to the first sample data 214 to produce first numerical representations 216 for each first data record within the first sample data 214. Again, the first VI print job 210 is altered to create the altered VI print job 210 and the same test data 212 is supplied to the altered VI print job 210 to produce second sample data 214. Similarly, the second sample data 214 comprises a plurality of second data records. The numeric generation application 202 is applied to the second sample data 214 to produce second numerical representations 216 for each second data record within the second sample data 214. Then, the method compares the first numerical representations 216 with corresponding ones of the second numerical representations 216 to identify altered data records within the second data records caused by the altering of the first VI print job 210.

The method can determine which data records were intended to be changed as a result of the altering of the first VI print job 210 and remove the data records that were intended to be changed from the altered data records (in item 112). Then, the user can manually or automatically compare the first data records with corresponding ones of the altered data records (that should not have changed) in item 112. In an alternative embodiment, the data records that were intended to be changed do not need to be removed from the altered data records. Thus, embodiments herein do not need to be limited to only observing the invariant portions of the test data (those that are not supposed to induce a change in the final output). Instead, the embodiments herein can compare both variant and invariant data in order to insure that each is treated as expected—noting the numeric code shifts, and checking the images for the resultant output from the variant data.

The process of comparing the first and second numerical representations 216 identifies the altered records as ones of the second data records that correspond to the second numerical representations 216 that are different than corresponding ones of the first numerical representations 216. A corresponding numerical representation is one that is generated when a corresponding data record (e.g., the same page, the same line, etc.) is processed through the numeric generation application. In other words, if the numerical representations 216 of corresponding first and second data records match, they are considered to be the same and are not identified as altered records. To the contrary, if the numerical representations 216 of corresponding first and second data records do not match, they are considered to be altered records. If such records were not intended to be changed by the altering of the VI print job 210, they are maintained as altered records so that they can be later evaluated by the user.

The VI print job 210 generally comprises a plurality of VI print programs. Therefore, the process of altering the VI print job 210 can actually comprise only a single alteration of just one of the VI print programs or can comprise multiple alterations of one or more VI print programs.

The embodiments herein also include a system for automatically performing regression testing of output of an altered variable information print job 210 (program). In one example, the system includes a processor 200, a numeric generation application 202, an editor 204, a comparator 206, and a database 208 all connected together (physically or operatively) by a network or wiring.

The processor 200 is adapted to perform many functions, one of which includes processing the variable information (VI) print job 210. Further the processor can include a computer program product comprising a computer-usable data carrier storing instructions that, when executed by a computer, cause the computer to perform the methods and services described herein. As described above, the VI print job 210 produces first sample data 214 from test data 212 when processed by the processor 200. The numeric generation application 202 is adapted to produce the numerical representations 216 from the first sample data 214.

The editor 204 is adapted to receive input from users and other sources to alter the VI print job 210 so as to create the altered VI print job 210. Again, the altered VI print job 210 is adapted to produce the second sample data 214 from the test data 212, when processed by the processor 200. Further, the numeric generation application 202 is adapted to produce the numerical representations 216 from the second sample data 214.

The comparator 206 is adapted to compare the numerical representations 216 to identify altered data records that were changed by the altering of the first VI print job 210. The comparator 206 is further adapted to identify the altered records as ones that correspond to numerical representations 216 that are different after the altering of the VI print job 210.

The editor 204 is further adapted to receive input regarding which data records within the second data that were intended to be changed as a result of the altering of the VI print job 210 and the processor 200 is further adapted to remove the data record that were intended to be changed from the altered data records. Also, the editor 204 is further adapted to alter a characteristic of at least one of the VI print programs. The editor 204 can comprise a user interface, etc. such as a graphic user interface (GUI) and can include a display and tactile input devices, such a keys and/or pointers.

Thus, as shown above, the reference output that needs to be checked for accuracy can entail hundreds, or even thousands, of pages. The amount of manual labor (or automated processing time) for such visual comparisons forces companies to hold off on any minor changes, primarily because the cost to validate, or regression test, exceeds any savings (or cost avoidance) incurred by making the change. Further, manual and automatic visual inspection of each and every page pair (old to new) is both error-prone and expensive.

Thus, while one method of regression testing manually or automatically compares the before and after data sets for any visual differences, as the number of samples, the number of design specifications, or the number of sample data instances (or any combination thereof) increases, the number of comparisons necessary also increases. Therefore, the size and complexity of the task can grow to such unmanageable proportions that change requests may linger unfulfilled because the cost to perform the testing exceeds the cost saved by the change. The embodiments above address such issues by converting the visual data to numeric data and performing of such numeric data before and after the VI print program change to validate that the revised VI print program does not make unexpected and/or unwanted changes to the visual data.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A computer-implemented method comprising:
   supplying test data to a variable information (VI) print job to produce a first print job output using a computer;
   applying a numeric generation application to said first print job output to produce first numerical representations of said first print job output using said computer;
   receiving user alteration input to alter said VI print job;
   altering said VI print job using said user alteration input to create an altered VI print job;
   supplying said test data to said altered VI print job to produce a second print job output that is different from said first print job output;
   applying said numeric generation application to said second print job output to produce second numerical representations of said second print job output using said computer;
   comparing said first numerical representations of said first print job output to said second numerical representations of said second print job output to identify altered visual data records caused by said altering of said VI print job;
   receiving second user input regarding visual data records of said first print job output intended to be changed as a result of said alteration input;
   removing said visual data records of said first print job output intended to be changed from said altered visual data records, using said second user input, to identify unexpected altered visual data records that are different from said visual data records of said first print job output intended to be changed, using said computer; and
   outputting only said unexpected altered visual data records and corresponding visual data records of said first print job output for visual comparison.

2. The method according to claim 1, further comprising one of manually and automatically visually comparing said corresponding visual data records of said first print job output with corresponding unexpected altered visual data records.

3. The method according to claim 1, wherein said comparing identifies said altered visual data records as ones that correspond to numerical representations that are different after said altering of said VI print job using said computer.

4. The method according to claim 1, wherein said VI print job comprises a plurality of VI print programs and wherein said altering alters a characteristic of at least one of said VI print programs.

5. A method comprising:
   supplying test data to a first variable information (VI) print job to produce first sample data using a computer, wherein said first sample data comprises a plurality of first print jobs output;
   applying a numeric generation application to said first sample data to produce first numerical representations for each of said first print jobs output within said first sample data using said computer;
   receiving user alteration input to alter said VI print job;
   altering said first VI print job using said user alteration input to create an altered VI print job;
   supplying said test data to said altered VI print job to produce second sample data, wherein said second sample data comprises a plurality of second print jobs output that is different from said first print jobs output;
   applying said numeric generation application to said second sample data to produce second numerical representations for each of said second print jobs output within said second sample data using said computer;
   comparing said first numerical representations with corresponding ones of said second numerical representations to identify altered visual data records within said second print jobs output caused by said altering of said first VI print job;

receiving second user input regarding visual data records of said first print jobs output intended to be changed as a result of said alteration input;

removing said visual data records of said first print jobs output intended to be changed from said altered visual data records, using said second user input, to identify unexpected altered visual data records that are different from said visual data records of said first print jobs output intended to be changed, using said computer; and outputting only said unexpected altered visual data records and corresponding visual data records of said first print jobs output for visual comparison.

6. The method according to claim 5, further comprising one of manually and automatically visually comparing said corresponding visual data records of said first print jobs output with corresponding ones of said unexpected altered visual data records.

7. The method according to claim 5, wherein said comparing identifies said altered visual data records as ones of said second print jobs output that correspond to said second numerical representations that are different than corresponding ones of said first numerical representations using said computer.

8. The method according to claim 5, wherein said first VI print job comprises a plurality of VI print programs and wherein said altering alters a characteristic of at least one of said VI print programs.

9. A system comprising:
a processor adapted to process a variable information (VI) print job, wherein said VI print job produces a first print job output from test data when processed by said processor;

a numeric generation application stored on a non-transitory computer-usable data storage medium operatively connected to said processor, wherein said numeric generation application produces first numerical representations of said first print job output;

an editor stored on a non-transitory computer-usable data storage medium operatively connected to said processor, wherein said editor receives user alteration input to alter said VI print job, wherein said editor alters said VI print job using said user alteration input to create an altered VI print job, wherein said altered VI print job produces a second print job output that is different from said first print job output from said test data when processed by said processor, and wherein said numeric generation application produces second numerical representations of said second print job output; and a comparator operatively connected to said processor, wherein said comparator compares said first numerical representations of said first print job output to said second numerical representations of said second print job output to identify altered visual data records caused by said altering of said first VI print job;

wherein said editor receives second user input regarding visual data records of said first print job output intended to be changed as a result of said alteration input, wherein said processor removes said visual data records of said first print job output intended to be changed from said altered visual data records, using said second user input, to identify unexpected altered visual data records that are different from said visual data records of said first print job output intended to be changed, using said computer, and wherein said processor outputs only said unexpected altered visual data records and corresponding visual data records of said first print job output for visual comparison.

10. The system according to claim 9, wherein said comparator identifies said altered visual data records as ones that correspond to numerical representations that are different after said altering of said VI print job.

11. The system according to claim 9, wherein said VI print job comprises a plurality of VI print programs and wherein said editor alters a characteristic of at least one of said VI print programs.

12. The system according to claim 9, further comprising a user interface operatively connected to said editor.

13. A non-transitory computer-usable data storage medium storing instructions that, when executed by a computer, cause the computer to perform a method comprising:
supplying test data to a variable information (VI) print job to produce a first print job output;

applying a numeric generation application to said first print job output to produce first numerical representations of said first print job output;

receiving user alteration input to alter said VI print job;

altering said VI print job using said user alteration input to create an altered VI print job;

supplying said test data to said altered VI print job to produce a second print job output that is different from said first print job output;

applying said numeric generation application to said second print job output to produce second numerical representations of said second print job output;

comparing said first numerical representations of said first print job output to said second numerical representations of said second print job output to identify altered visual data records caused by said altering of said VI print job;

receiving second user input regarding visual data records of said first print job output intended to be changed as a result of said alteration input;

removing said visual data records of said first print job output intended to be changed from said altered visual data records, using said second user input, to identify unexpected altered visual data records that are different from said visual data records of said first print job output intended to be changed, using said computer; and outputting only said unexpected altered visual data records and corresponding visual data records of said first print job output for visual comparison.

14. The non-transitory computer-usable data storage medium according to claim 13, wherein said method further comprises one of manually and automatically visually comparing said corresponding visual data records of said first print job output with corresponding unexpected altered visual data records.

15. The non-transitory computer-usable data storage medium according to claim 13, wherein said comparing identifies said altered visual data records as ones that correspond to numerical representations that are different after said altering of said VI print job.

16. The non-transitory computer-usable data storage medium according to claim 13, wherein said VI print job comprises a plurality of VI print programs and wherein said altering alters a characteristic of at least one of said VI print programs.

* * * * *